(12) United States Patent
Chan et al.

(10) Patent No.: US 9,929,619 B2
(45) Date of Patent: Mar. 27, 2018

(54) END CAP ASSEMBLY FOR AN ELECTRIC MOTOR

(75) Inventors: Chi Keung Chan, Hong Kong (CN); Wu Chuan Liu, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 270 days.

(21) Appl. No.: 13/547,707

(22) Filed: Jul. 12, 2012

(65) Prior Publication Data

US 2013/0015738 A1    Jan. 17, 2013

(30) Foreign Application Priority Data

Jul. 12, 2011    (CN) .......................... 2011 1 0194563

(51) Int. Cl.
*H02K 5/14*    (2006.01)
*H02K 5/22*    (2006.01)

(52) U.S. Cl.
CPC ............... *H02K 5/225* (2013.01); *H02K 5/14* (2013.01); *H02K 5/143* (2013.01); *H02K 5/145* (2013.01); *H02K 5/148* (2013.01)

(58) Field of Classification Search
CPC .......... H02K 5/148; H02K 5/14; H02K 5/143; H02K 5/225; H01R 13/11; H01R 13/10; H01R 12/71
USPC ........... 310/40 MM, 71, 246, 247, 249, 245, 310/68 R, 238; 439/682, 683, 685, 686; 174/549, 68.1, 68.2, 74 R, 72 B, 73.1, 174/94 R
See application file for complete search history.

(56) References Cited

U.S. PATENT DOCUMENTS

| | | | | |
|---|---|---|---|---|
| 2,578,436 A | * | 12/1951 | Lundy ................... | H01R 13/11 439/861 |
| 3,059,213 A | * | 10/1962 | Lalonde ....................... | 439/682 |
| 4,004,845 A | * | 1/1977 | Sochor .......................... | 439/682 |
| 4,217,024 A | * | 8/1980 | Aldridge ................ | H01R 4/028 439/381 |
| 5,216,305 A | | 6/1993 | Strobl | |
| 6,048,230 A | * | 4/2000 | Kikuchi ................. | H01R 13/11 439/668 |
| 6,465,920 B2 | * | 10/2002 | Harita et al. .................... | 310/71 |

(Continued)

FOREIGN PATENT DOCUMENTS

| KR | 100979265 | * | 7/2010 | |
|---|---|---|---|---|
| WO | WO 2010067149 A1 | * | 6/2010 | .......... H01R 13/112 |

OTHER PUBLICATIONS

Nah (KR100979265) English Translation.*

*Primary Examiner* — Quyen Leung
*Assistant Examiner* — Robert E Mates
(74) *Attorney, Agent, or Firm* — Muncy, Geissler, Olds & Lowe, P.C.

(57) ABSTRACT

An end cap assembly for an electric motor has an end cap body and at least two motor terminals. The end cap body has at least two holding structures for respectively holding the at least two motor terminals, each holding structure having at least one holder and a through slot. Each motor terminal has a base portion, a terminal portion and at least one mounting portion. The at least one mounting portion is mounted to the at least one holder of a corresponding holding structure. The terminal portion is inserted in the through slot to electrically connect to a male terminal of an external power supply plug. The terminal portion and the at least one mounting portion integrally extend from the base portion.

17 Claims, 5 Drawing Sheets

(56) References Cited

U.S. PATENT DOCUMENTS

| 6,555,943 B2* | 4/2003 | Walther et al. ............... 310/239 |
| 2004/0058231 A1* | 3/2004 | Takeshita et al. ............ 429/123 |
| 2010/0184339 A1* | 7/2010 | Ngo et al. ..................... 439/682 |

* cited by examiner

END CAP ASSEMBLY FOR AN ELECTRIC MOTOR

CROSS REFERENCE TO RELATED APPLICATIONS

This non-provisional patent application claims priority under 35 U.S.C. § 119(a) from Patent Application No. 201110194563.5 filed in The People's Republic of China on Jul. 12, 2011.

FIELD OF THE INVENTION

This invention relates to an end cap assembly for an electric motor and in particular, to electric terminals of the end cap assembly.

BACKGROUND OF THE INVENTION

A brush motor has a stator and a rotor with a shaft, a rotor core, a commutator fixed on the shaft, and rotor windings wound about teeth of the rotor core and electrically connected to segments of the commutator. In such a brush motor, electric terminals are required for connection to an external power supply. The electric terminals are generally mounted in an end cap of the stator and electrically connected to brushes of the motor so that the power can be supplied to the rotor windings via the electric terminals, the brushes and the commutator.

FIGS. 1 and 2 show an end cap for a permanent magnet direct current motor disclosed in U.S. Pat. No. 5,216,305. The end cap 14 is provided with two apertures 26 for receiving an external supply plug having two flat male terminals and carries a bearing 15, two brush leaves 16 each carrying a brush 17, and two U-shaped terminals 18. The U-shaped terminals 18 are anchored at their base 28 by rivets to brush arm mounting plates 25. Two limbs 29 of each U-shaped terminal 18 are inserted in an elongate axial channel 27 formed in the end cap.

The rivet is a source of failure of this type of motor and is time consuming to assemble during production. Also the U-shaped terminal needs to be gently deformed or compressed to enable it to be inserted into the slot during assembly, thus requiring time and special care.

SUMMARY OF THE INVENTION

Thus there is a desire for an improved end cap assembly with motor terminals of this type, which is reliable and easier to assembly.

Accordingly, in one aspect thereof, the present invention provides an end cap assembly for an electric motor, comprising an end cap body, and at least two motor terminals assembled to the end cap body and electrically insulated from each other, the end cap body having at least two holding structures for respectively holding the at least two motor terminals, each holding structure having at least one holder and a through slot, each motor terminal having a base portion, a terminal portion and at least one mounting portion, the at least one mounting portion being mounted to the at least one holder of a corresponding holding structure, the terminal portion being inserted in the through slot to electrically connect to a male terminal of an external power supply plug; wherein the terminal portion and the at least one mounting portion integrally extend from the base portion.

Preferably, the terminal portion has two resilient branches, each branch having a connecting end connected to the base portion, a free end with a tip and remote from the base portion, and a bent part between the connecting end and the free end, the bent parts of the two branches being curved inwardly towards each other.

Preferably, the through slot has a first opening for the entry of the male terminal into a space between the branches of the terminal portion, a second opening for the entry of the branches into the through slot, a wider part adjacent to the second opening, and a narrower part adjacent to the first opening.

Preferably, the free ends of the branches extend into the narrower part.

Preferably, the maximum distance D1 between outer surfaces of the free ends of the branches in the non-deformed state is smaller than the width S1 of the second opening.

Preferably, the maximum distance D3 between inner surfaces of the free ends of the branches in the non-deformed state is smaller than the width S3 of the narrower part.

Preferably, a slope is formed at the tip of the free end of each branch.

Preferably, a guiding groove is formed in the through slot and the minimum distance D2 between inner surfaces of the bent parts of the branches in the assembled state is smaller than the width S2 of the guiding groove.

Preferably, the maximum distance D1 between outer surfaces of the free ends of the branches in the non-deformed state is greater than the width S3 of the narrower part.

According to a second aspect, the present invention also provides an end cap assembly for an electric motor, comprising an end cap body and at least two motor terminals assembled to the end cap body and electrically insulated from each other, the end cap body having at least two holding structures for respectively holding the at least two motor terminals, each holding structure having a through slot, each motor terminal having a base portion and two resilient branches extending from the base portion, the two branches being inserted in the through slot to electrically connect to a male terminal of an external power supply plug, each branch having a connecting end connected to the base portion, a free end with a tip and remote from the base portion, and a bent part between the connecting end and the free end; wherein the through slot has a first opening for the entry of the male terminal into a space between the branches, a second opening for the entry of the branches into the through slot, a wider part adjacent to the second opening, and a narrower part adjacent to the first opening, the free ends of the branches extending into the narrower part.

Preferably, the maximum distance D1 between outer surfaces of the free ends of the branches in the non-deformed state is smaller than the width S1 of the second opening.

Preferably, the maximum distance D3 between inner surfaces of the free ends of the branches in the non-deformed state is smaller than the width S3 of the narrower part.

Preferably, a slope is formed at the tip of the free end of each branch.

Preferably, a guiding groove is formed in the through slot and the minimum distance D2 between inner surfaces of the bent parts of the branches in the assembled state is smaller than the width S2 of the guiding groove.

Preferably, the maximum distance D1 between outer surfaces of the free ends of the branches in the non-deformed state is greater than the width S3 of the narrower part.

In the embodiments of the present invention, the base portion, the terminal portion and the mounting portions of the motor terminal are formed as a single piece and the process of riveting the terminal portion to the base portion is not required. Furthermore, the branches of the terminal portion can directly enter into the through slot and the process of inwardly bending the free ends of the branches before the free ends being inserted into the through slot is not required. Therefore the cost is reduced as the manufacture process is simplified and the stability of the motor is improved as the intermittent function of the motor caused by poor riveting and deformation of branches due to bending the free ends, is avoided.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
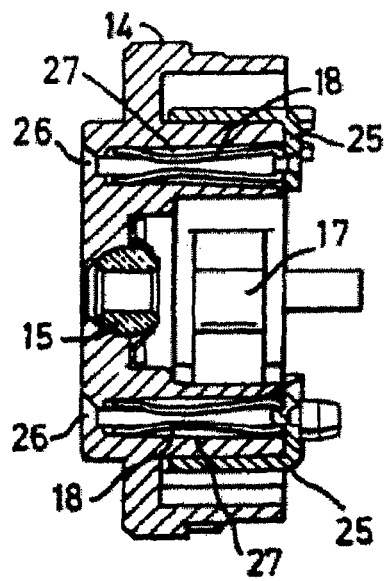
FIGS. 1 and 2 show a prior art end cap.
Figure 2:
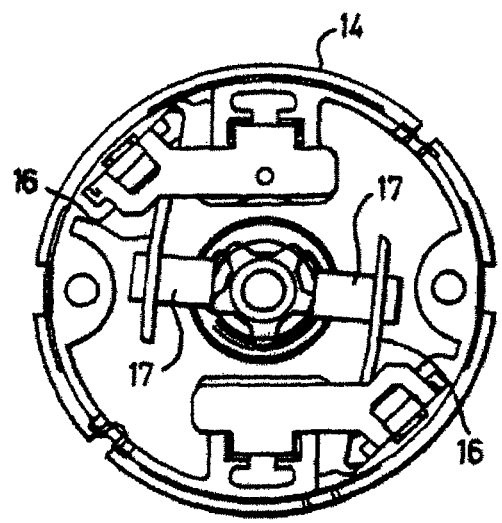
Figure 3:
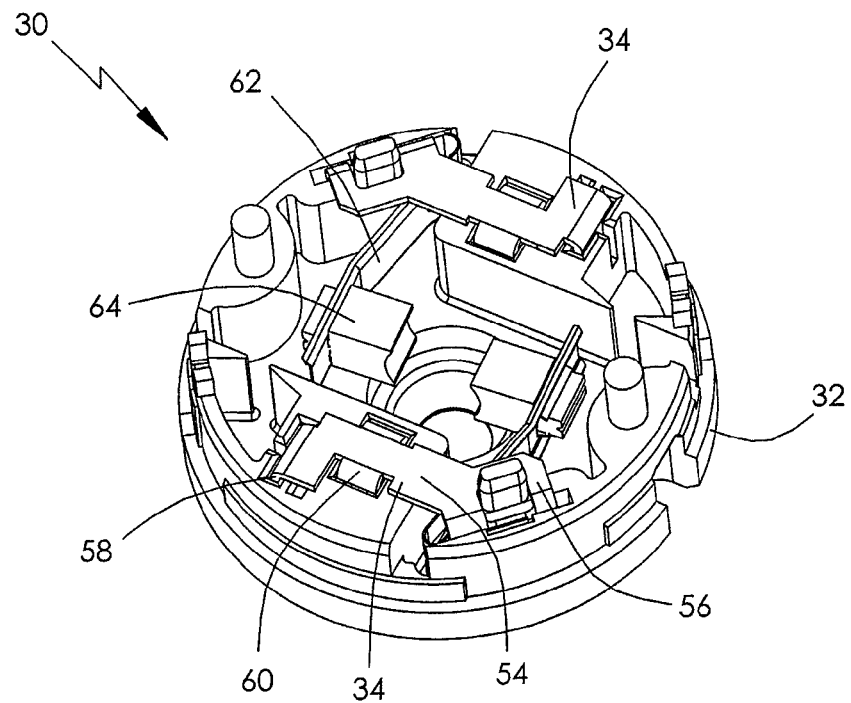
FIG. 3 is a view of an end cap assembly in accordance with a preferred embodiment of the present invention.

FIG. 3 illustrates an end cap assembly for an electric motor in accordance with a preferred embodiment of the present invention. The end cap assembly 30 includes an end cap body 32 made of electrical insulating material, and two motor terminals 34 which are fixedly assembled to the end cap body 32 and electrically insulated from each other.

Figure 4:
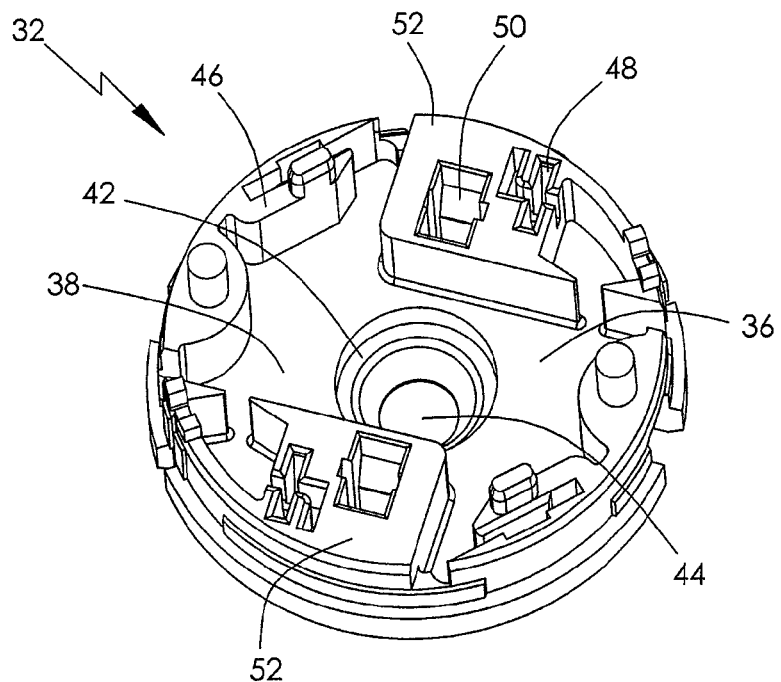
FIG. 4 is a view of an end cap body being a part of the end cap assembly of FIG. 3.
Figure 5:
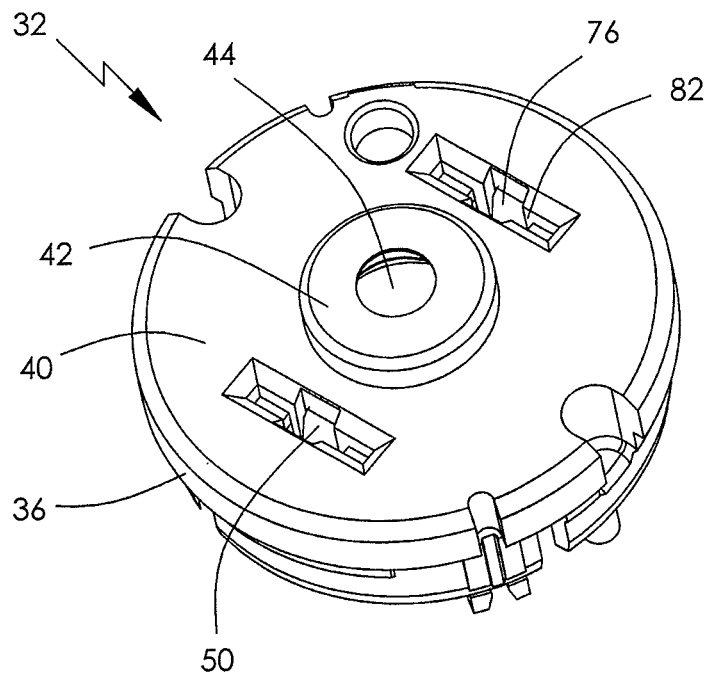
FIG. 5 is another view of the end cap body of FIG. 4.

As shown in FIGS. 4 and 5, the end cap body 32 has a circular base 36 with a first end surface 38, a second end surface 40, and a bearing holder 42 with a central hole 44 for holding a bearing for a shaft of the motor. Two holding structures for respectively holding the two motor terminals 34 are positioned diametrically opposite to each other relative to the central hole 44. Each holding structure has a first holder 46 axially extending from the outer periphery of the first end surface 38 of the base 36, and a second holder 48 and an axial through slot 50 which are formed on a projection 52 axially extending from the first end surface 38 of the base 36.

Figure 6:
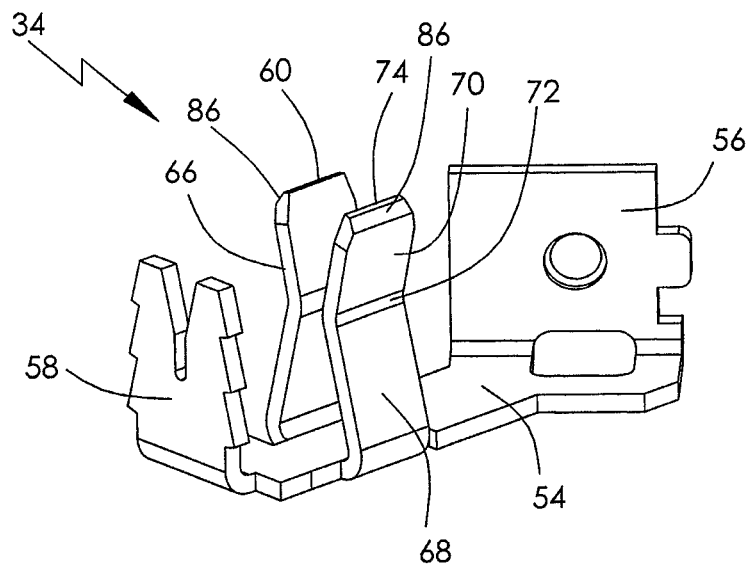
FIG. 6 illustrates a motor terminal being a part of the end cap assembly of FIG. 3.
Figure 7:
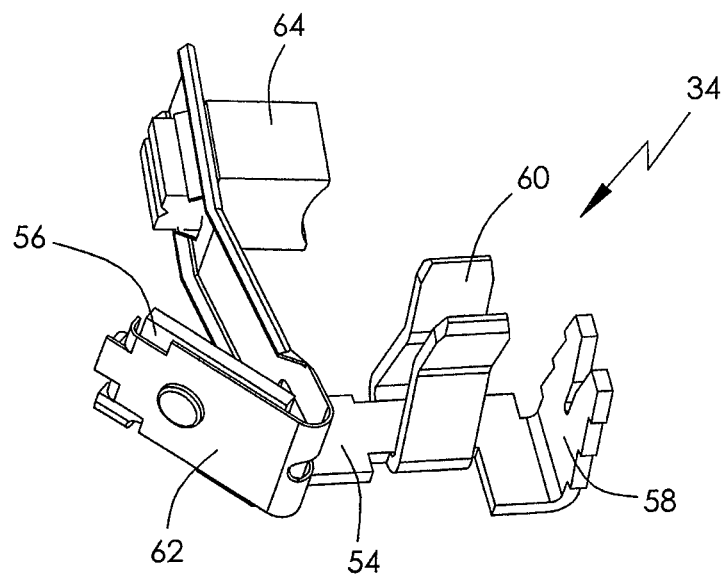
FIG. 7 is another view of the motor terminal of FIG. 6, connected with a brush arm carrying a brush.

As shown more clearly in FIGS. 6 and 7, each motor terminal 34 has a base portion 54 arranged to extend parallel to the base 36, a first mounting portion 56, a second mounting portion 58, and a terminal portion 60 for connection to a flat male terminal of an external power supply plug. The mounting portions 56, 58 and the terminal portion 60 integrally extend from the base portion 54, such that each motor terminal is a monolithic structure formed from a single sheet of material. The terminal portion 60 is arranged between the first and second mounting portions 56, 58 and inserted in the axial through slot 50 of a corresponding holding structure of the end cap body 32. A brush arm 62 carrying a brush 64 at one end thereof, is mounted to and electrically connected with the first mounting portion 56, at the other end. The first mounting portion 56 and said other end of the brush arm 62 are inserted in the first holder 46 of the corresponding holding structure. The second mounting portion 58 is inserted in the second holder 48 of the corresponding holding structure. The second mounting portion is formed with a number of bards for resisting removal, once inserted. Thus the motor terminals 34 and the brush arms 62 are assembled to the end cap body 32 and the power supplied from the external power supply plug is provided to the brushes 64 via the motor terminals 34 and the brush arms 62.

The terminal portion 60 has two resilient branches 66 opposite to each other. Each branch 66 has a connecting end 68 connected to the base portion 54, a free end 70 remote from the base portion 54, and a bent part 72 between the connecting end 68 and the free end 70. The bent part 72 is preferably closer to the tip 74 of the free end 70 than to the base portion 54. The bent parts 72 of the two branches 66 are curved inwardly towards each other.

Figure 8:
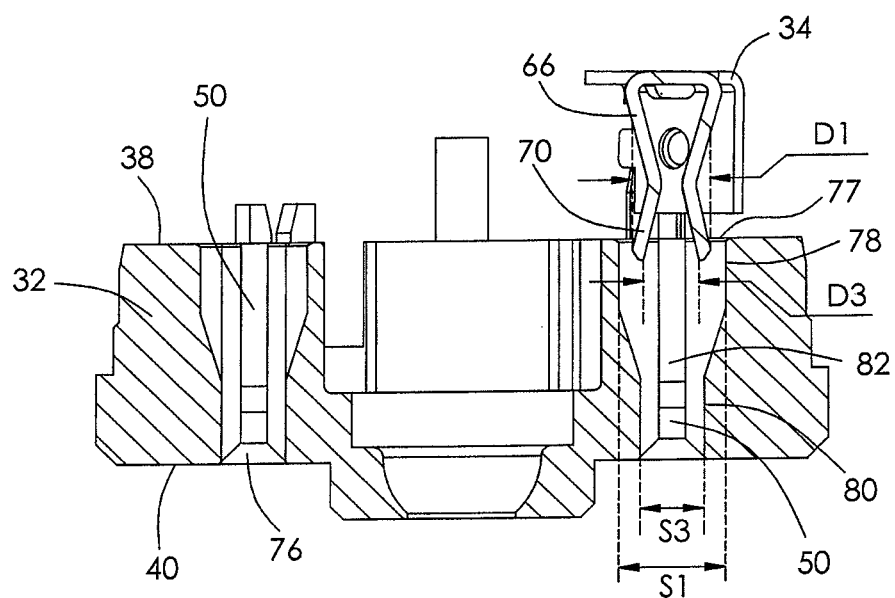
FIG. 8 is a sectional view of the end cap body of FIG. 4, with a motor terminal shown positioned ready to be fitted to the end cap body.
Figure 9:
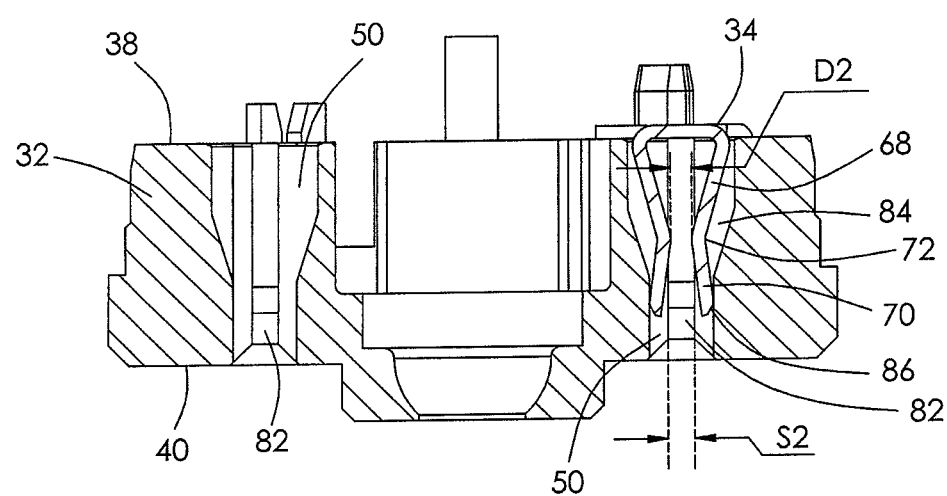
FIG. 9 is a sectional view of the end cap body of FIG. 4, with the motor terminal fitted to the end cap body.

Also referring to FIGS. 8 and 9, each axial through slot 50 has a first opening 76 at the second end surface side and a second opening 77 at the first end surface side of the end cap body 32, a wider part 78 adjacent to the second opening 77, and a narrower part 80 adjacent to the first opening 76. After the terminal portion 60 of the motor terminal 34 is assembled in the axial through slot 50, the free ends 70 of the resilient branches 66 extend into the narrower part 80. The maximum distance D1 between the outer surfaces of the free ends 70 of the branches 66 under the non-deformed state is greater than the width S3 of the narrower part 80 such that tips 74 of the free ends 70 press against the opposite side walls of the narrower part 80 after the terminal portion 60 is assembled in the through slot 50. A guiding groove 82 for guiding the male terminal of the external power supply plug into the separation between the two bent parts 72 is formed in the axial through slot 50. The width of the male terminal of the external power plug is equal to or slightly smaller than the width of the guiding groove 82. A space 84 allowing the outward deformation of the bent part 72 is provided between the outer surface of bent part 72 and the side wall of the axial through slot 50. The minimum distance D2 between the inner surfaces of the bent parts 72 of the branches 66 under the assembled state is smaller than the width S2 of the guiding groove 82 such that the terminal of the external power supply plug will resiliently deform the terminal portion on insertion so that it is tightly held between the bent parts 72.

Preferably, the maximum distance D1 between the outer surfaces of the free ends 70 of the branches 66 in the non-deformed state is smaller than the width S1 of a second opening 77 at the first end surface side of the end cap body 32 such that the free ends 70 can directly enter into the axial through slot 50 without any pre-deforming process being required. The maximum distance D3 between the inner surfaces of tips 74 of the two free ends 70 under the non-deformed state is smaller than the width S3 of the narrower part 80. By this configuration the free ends 70 can easily enter into the narrower part 80. The free end 70 includes an inner surface and an outer surface parallel to the inner surface. The tip 74 includes a plane surface vertically connected to the inner surface of the free end 70, and a sloped surface 86 connected between the plane surface and the outer surface of the free end 70. A first obtuse angle is formed between the sloped surface 86 and the outer surface of the free end 70. A second obtuse angle is formed between the plane surface and the sloped surface.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the motor terminal may be mounted to the end cap body by a single mounting portion.

The invention claimed is:

1. An end cap assembly for an electric motor, comprising an end cap body, and at least two motor terminals assembled to the end cap body and electrically insulated from each other, the end cap body having at least two holding structures for respectively holding the at least two motor terminals, each holding structure having a first holder and a second holder having a structure that is different from a structure of the first holder and a through slot between the first holder and the second holder, the through slot isolated from the first holder and the second holder, each motor terminal having a base portion, a terminal portion and at least two mounting portions, the at least two mounting portions being mounted to the first holder and the second holder of a corresponding holding structure, the terminal portion being arranged between the at least two mounting portions along a direction from the at least two mounting portions to the terminal portion and inserted in the through slot to electrically connect to a male terminal of an external power supply plug;

wherein the terminal portion and the at least two mounting portions integrally formed on the base portion with respective bent portions therebetween, such that the terminal portion and the at least two mounting portions are bent at the respective bent portions in a same direction, the terminal portion and the at least two mounting portions each include a distal end positioned on an opposite side from the corresponding bent portion, and the distal end of the terminal portion and the distal ends of the at least two mounting portions are separated from each other.

2. The assembly of claim 1, wherein the terminal portion has two resilient branches, each branch having a connecting end connected to the base portion, a free end with a tip remote from the base portion, and a bent part between the connecting end and the free end, the bent parts of the two branches being curved inwardly towards each other.

3. The assembly of claim 2, wherein the through slot has a first opening for the entry of the male terminal into a space between the branches of the terminal portion, a second opening for the entry of the branches into the through slot, a wider part adjacent to the second opening, and a narrower part adjacent to the first opening.

4. The assembly of claim 3, wherein the free ends of the branches extend into the narrower part.

5. The assembly of claim 3, wherein a maximum distance D1 between outer surfaces of the free ends of the branches in a non-deformed state is smaller than a width S1 of the second opening.

6. The assembly of claim 3, wherein a maximum distance D3 between inner surfaces of the free ends of the branches in the non-deformed state is smaller than a width S3 of the narrower part.

7. The assembly of claim 2, wherein the free end of each branch comprises an inner surface and an outer surface parallel with the inner surface, the tip of the free end of each branch comprises a plane surface vertically connected to the inner surface, and a sloped surface connected between the plane surface and the outer surface, a first obtuse angle is fainted between the sloped surface and the outer surface, and a second obtuse angle is formed between the plane surface and the sloped surface.

8. The assembly of claim 2, wherein a guiding groove is formed in the through slot and a minimum distance D2 between inner surfaces of the bent parts of the branches in the assembled state is smaller than a width S2 of the guiding groove.

9. The assembly of claim 3, wherein a maximum distance D1 between outer surfaces of the free ends of the branches in a non-deformed state is greater than a width S3 of the narrower part.

10. An end cap assembly for an electric motor, comprising an end cap body and at least two motor terminals assembled to the end cap body and electrically insulated from each other, the end cap body having at least two holding structures for respectively holding the at least two motor terminals, each holding structure having a first holder and a second holder having a structure that is different from a structure of the first holder and a through slot between the first holder and the second holder, each motor terminal having a base portion and two resilient branches being integrally connected to the base portion via two symmetric bent parts and extending from the base portion, the two resilient branches being inserted in the through slot to electrically connect to a male terminal of an external power supply plug, each resilient branch having a connecting end connected to the base portion via the two symmetric bent parts therefore forming acute angles between the connecting end and the base portion, a free end with a tip remote from the base portion, and a bent part between the connecting end and the free end;

wherein the through slot has a first opening for the entry of the male terminal into a space between the resilient branches, a second opening for the entry of the resilient branches into the through slot, a wider part adjacent to the second opening, a narrower part adjacent to the first opening, the free ends of the resilient branches extending into the narrower part, and an inclined surface formed between the wider part and the narrow part, wherein the maximum distance D1 between outer surfaces of the free ends of the resilient branches in the non-deformed state is greater than the width S3 of the narrower part, thereby the outer surfaces of the free ends of the resilient branches contact an inner surface of the narrower part of the through slot at the time when the free ends of the resilient branches are inserted into the narrower part, and wherein each free end has an inner surface and an outer surface parallel with the inner surface, the inner surface of the free end of one resilient branch faces the inner surface of the free end of the other resilient branch, the tip of the free end of each resilient branch comprises a plane surface vertically connected to the inner surface, and a sloped surface connected between the plane surface and the outer surface, a first obtuse angle is formed between the sloped surface and the outer surface, and a second obtuse angle is formed between the plane surface and the sloped surface.

11. The assembly of claim 10, wherein the maximum distance D1 between outer surfaces of the free ends of the branches in the non-deformed state is smaller than the width S1 of the second opening.

12. The assembly of claim 10, wherein the maximum distance D3 between inner surfaces of the free ends of the branches in the non-deformed state is smaller than the width S3 of the narrower part.

13. The assembly of claim 10, wherein a guiding groove is formed in the through slot and the minimum distance D2 between inner surfaces of the bent parts of the branches in the assembled state is smaller than the width S2 of the guiding groove.

14. An end cap assembly for an electric motor, comprising an end cap body and at least two motor terminals assembled to the end cap body and electrically insulated from each other, the end cap body having at least two holding structures for respectively holding the at least two motor terminals, each holding structure having a first holder and a second holder having a structure that is different from a structure of the first holder and a through slot between the first holder and the second holder, each motor terminal having a base portion and two resilient branches being integrally connected to the base portion via two symmetric bent parts and extending from the base portion, the two branches being inserted in the through slot to electrically connect to a male terminal of an external power supply plug, each branch having a connecting end connected to the base portion via the two symmetric bent parts therefore forming acute angles between the connecting end and the base portion, a free end with a tip remote from the base portion, and a bent part between the connecting end and the free end, wherein the through slot has a first opening for the entry of the male terminal into a space between the branches, a second opening for the entry of the branches into the through slot, a wider part adjacent to the second opening, and a narrower part adjacent to the first opening, the free ends of the branches extending into the narrower part, the first opening having a length that corresponds to a width of the branches and a width, wherein a guiding groove for receiving and guiding a single male terminal into the space between the branches is formed in the axial through slot, the guiding groove being located between the branches and the branches being located at opposite sides of the guiding groove, the guiding groove partly overlapping with the branches in a direction of the male terminal entering into the space, the guiding groove having a length and a width that corresponds to a length and a width of the male terminal, respectively;

wherein the length of the guiding groove is greater than the length of the first opening of the through slot, and the width of the first opening of the through slot is greater than the width of the guiding groove; and wherein each free end has an inner surface and an outer surface parallel with the inner surface, the inner surface of the free end of one branch faces the inner surface of the free end of the other branch, the tip of the free end of each branch comprises a plane surface vertically connected to the inner surface, and a sloped surface connected between the plane surface and the outer surface, a first obtuse angle is formed between the sloped surface and the outer surface, and a second obtuse angle is formed between the plane surface and the sloped surface.

15. The assembly of claim 1, wherein each motor terminal comprises a base portion and two resilient branches extending from the base portion and being inserted in the through slot, and a guiding groove for guiding the male terminal into a space formed between the two resilient branches is formed in the axial through slot, the guiding groove being located between the resilient branches and the resilient branches being located at opposite sides of the guiding groove, the guiding groove partly overlapping with the resilient branches in a direction of the male terminal entering into the space.

16. An end cap assembly for an electric motor, comprising an end cap body, and at least two motor terminals assembled to the end cap body and electrically insulated from each other, the end cap body having at least two holding structures for respectively holding the at least two motor terminals, each holding structure having at least two holders and a through slot between the at least two holders, the through slot isolated from the at least two holders, each motor terminal having a base portion, a terminal portion and at least two mounting portions, the at least two mounting portions being mounted to the at least two holders of a corresponding holding structure, the whole terminal portion being arranged between the at least two mounting portions and inserted in the through slot to electrically connect to a male terminal of an external power supply plug;

wherein the terminal portion and the at least two mounting portions are formed by extending from a surface of the base portion along a same direction substantially perpendicular to the surface of the base portion.

17. The assembly of claim 1, wherein the terminal portion and the at least two mounting portions are formed by extending from a surface of the base portion along a same direction substantially perpendicular to the surface of the base portion.

* * * * *